No. 851,996. PATENTED APR. 30, 1907.
L. PALMER & A. L. TAYLOR.
HOSE CLAMP.
APPLICATION FILED JAN. 30, 1906.
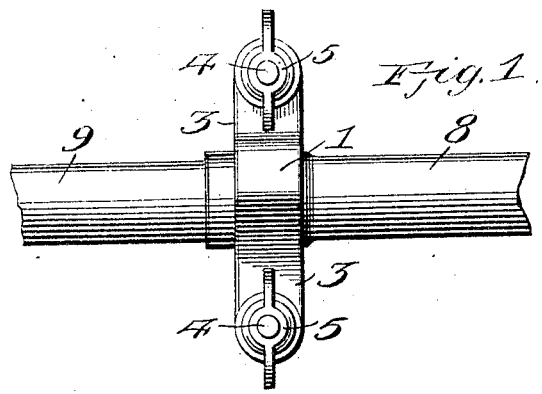
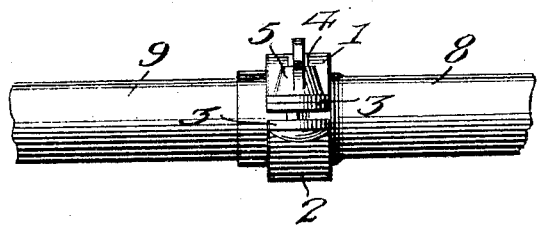
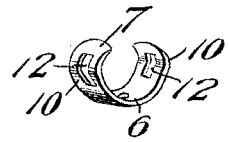
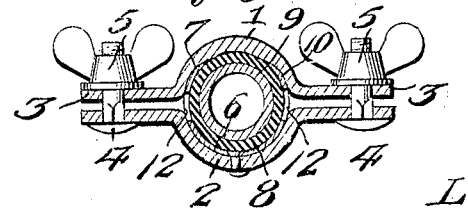
Inventors
L. Palmer
A. L. Taylor

UNITED STATES PATENT OFFICE.

LAFAYETTE PALMER AND ABRAHAM L. TAYLOR, OF HARRISBURG, PENNSYLVANIA.

HOSE-CLAMP.

No. 851,996.　　　Specification of Letters Patent.　　　Patented April 30, 1907.

Application filed January 30, 1906. Serial No. 298,715.

*To all whom it may concern:*

Be it known that we, LAFAYETTE PALMER and ABRAHAM L. TAYLOR, citizens of the United States, residing at Harrisburg, in the county of Dauphin and State of Pennsylvania, have invented new and useful Improvements in Hose-Clamps, of which the following is a specification.

This invention relates to hose clamps, the object of the invention being to provide a simple, convenient and reliable hose-clamp in which special provision is made for obtaining a firm bearing and clamping action entirely around the hose where the latter fits over the pipe or nozzle to which it is connected.

With the above general object in view, the invention consists in the novel construction, combination and arrangement of parts, as hereinafter fully described and claimed.

In the accompanying drawings, Figure 1 is a plan view of a hose clamp embodying the present invention. Fig. 2 is a side elevation of the same. Fig. 3 is a longitudinal section through the clamp extending transversely through the overlapping portions of the hose and pipe or nozzle to which it is connected. Fig. 4 is a detail perspective view of the spring clip.

Like reference numerals designate corresponding parts in all the figures of the drawings.

The hose clamp contemplated in this invention comprises two substantially similar members 1 and 2, the central or body portion of which is substantially semi-circular, as best illustrated in Fig. 3, so as to extend somewhat less than half way around the joint. Each member also comprises oppositely extending wings 3 which project from opposite sides of the semi-circular body portion. The wings of each clamping member lie opposite each other and are provided with holes for the reception of clamping bolts 4 which pass through the wings and receive clamping nuts 5, whereby the clamping members may be confined with any desired pressure around the joint.

In connection with one of the members, a spring metal clip 6 is employed. This clip is described on an arc somewhat in excess of a semi-circle, so as to embrace the joint a little more than one half way around the hose, and the extremities of the clip are bent inward, as shown at 7, so as to engage and retain the hose where the latter is slipped over the pipe of the nozzle, 8 designating a section of the hose, and 9 a metal pipe or nozzle, over the end of which the hose 8 is slipped preparatory to applying thereto the clamp. The opposite portions or arms 10 of the clip are provided with apertures 12 which render said arms more resilient at the point where they cross the space intervening between the wings 3 of the clamp members, and thus said arms 10 may be said to break joint with the clamp members, and said clip arms, taken in connection with the clamp members, provide a continuous bearing all around the joint. By reason of the particular shape and disposition of the arms of the clip, it will be understood that as the clamp members are drawn toward each other, they act upon the arms of the clip to crowd the same inward and make them conform to the outer contour of the hose, thus crowding said hose firmly against and around the pipe or nozzle within the same. A liquid-tight joint is thus obtained between the hose and the pipe or nozzle with which it is connected.

Having thus described the invention, we claim as new:

1. The herein described hose-clamp comprising oppositely arranged stiff clamp members having substantially semi-circular body portions, means for drawing said clamp members toward each other, and a spring clip connected to one of said members and comprising arms which together exceed a semi-circle, said arms being adapted to embrace and hold the hose sections frictionally, for the purpose described.

2. The herein described clamp comprising oppositely arranged members having substantially semi-circular body portions, means for drawing said clamp members toward each other, and a spring-clip carried by one of said members and comprising apertured spring arms with inbent extremities, said clip as a whole exceeding a semi-circle, and said arms being adapted to embrace and hold the hose sections frictionally, for the purpose described.

In testimony whereof, we affix our signatures in presence of two witnesses.

LAFAYETTE PALMER.
　　　　ABRAHAM L. TAYLOR.

Witnesses:
　ROBERT S. SHANER,
　WILLIAM C. ARMOR.